Oct. 15, 1963
D. K. HAUSEN
3,107,330
APPARATUS FOR MEASURING AMPLITUDE AND
FREQUENCY OF MODULATED SIGNALS
Filed Jan. 2, 1959
3 Sheets-Sheet 1
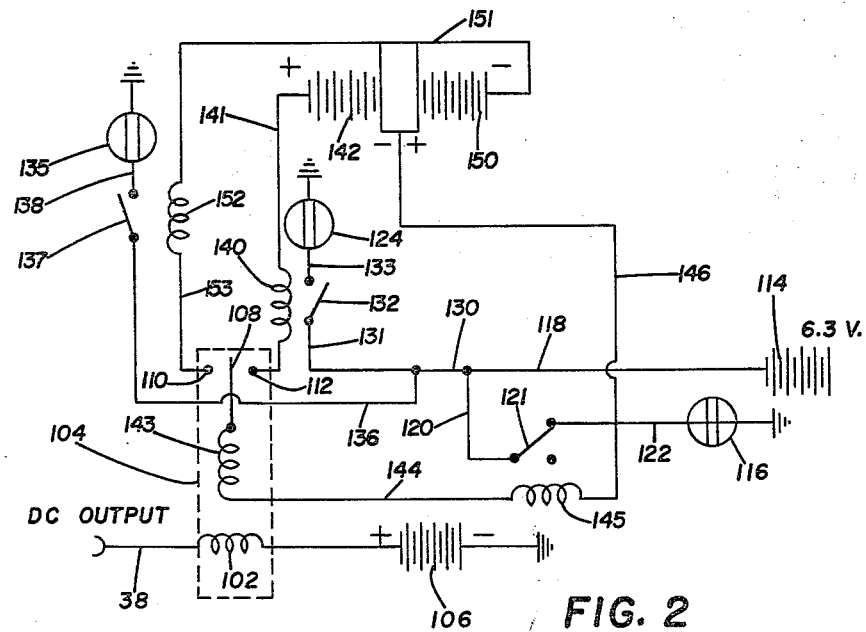
FIG. 2
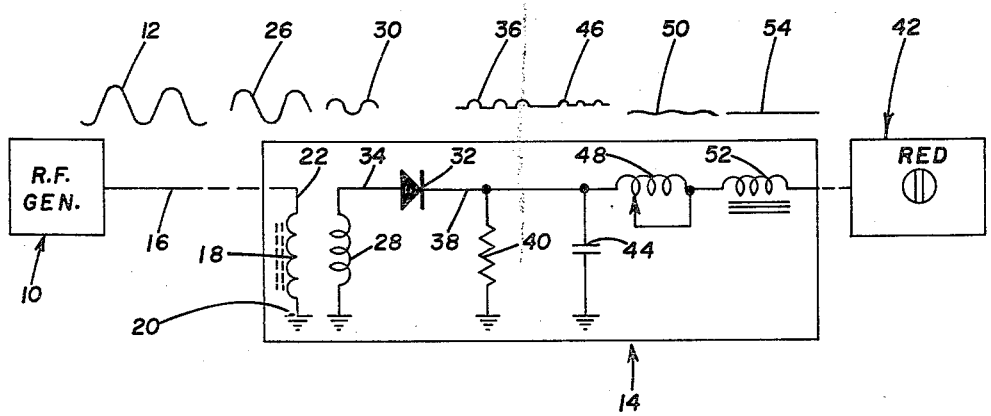
FIG. 1
INVENTOR.
DIETRICH K. HAUSEN
BY
ATTORNEY

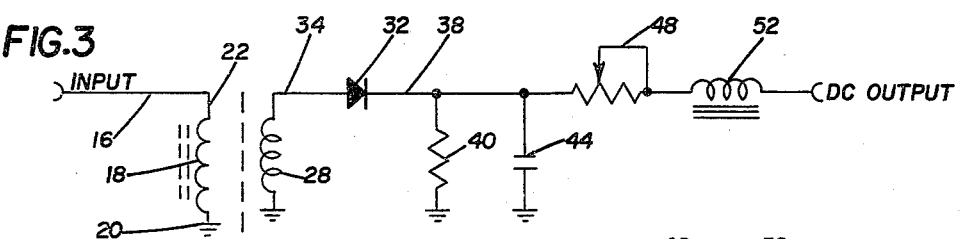
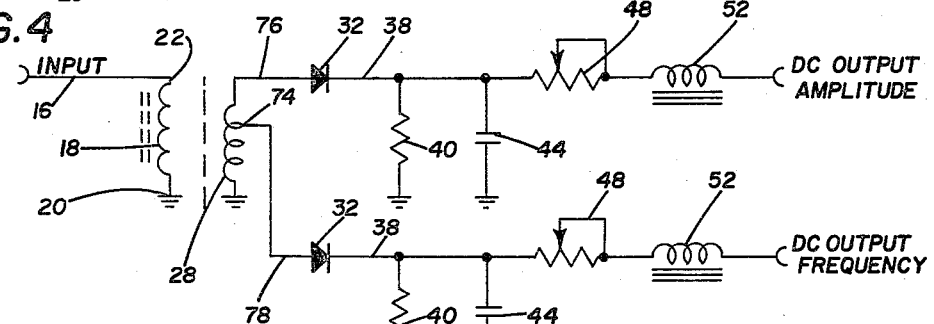
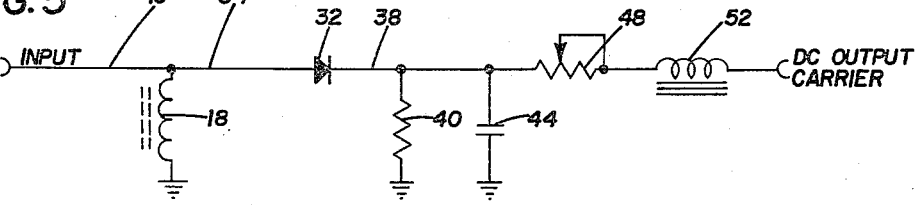
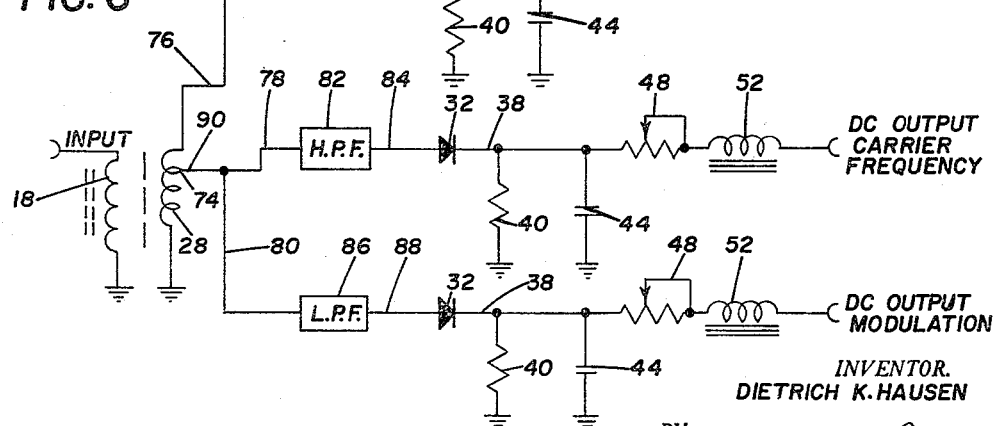
INVENTOR.
DIETRICH K. HAUSEN
ATTORNEY

Oct. 15, 1963     D. K. HAUSEN     3,107,330
APPARATUS FOR MEASURING AMPLITUDE AND
FREQUENCY OF MODULATED SIGNALS
Filed Jan. 2, 1959     3 Sheets-Sheet 3
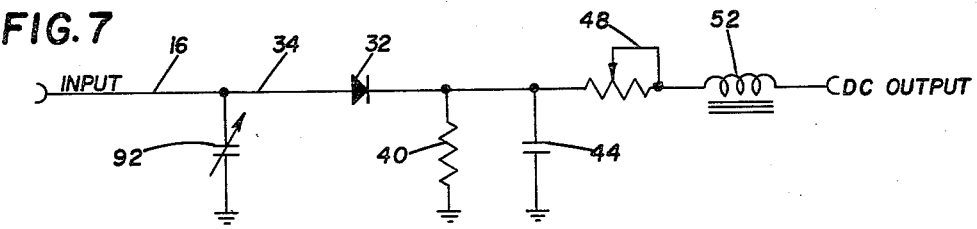
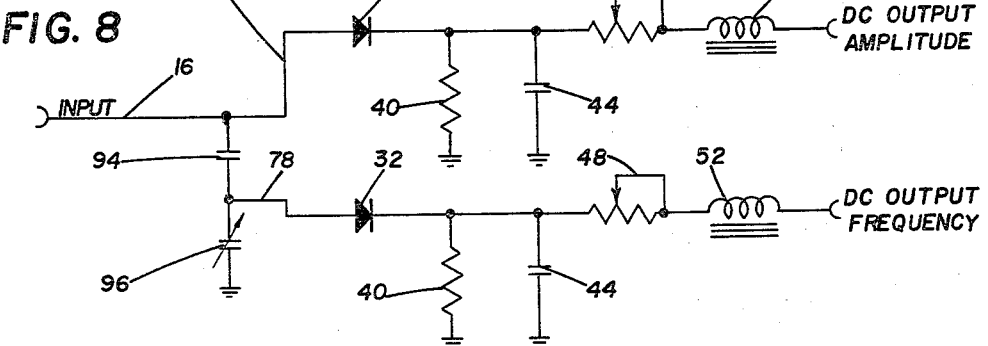
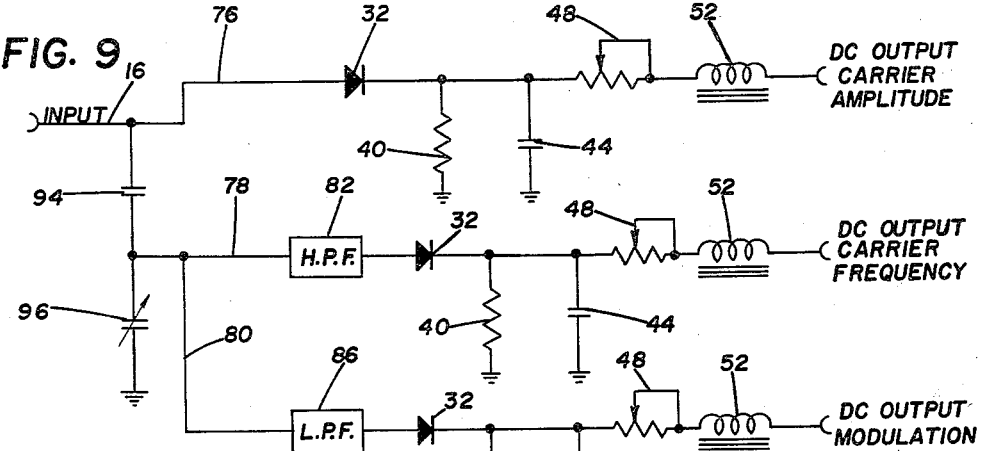
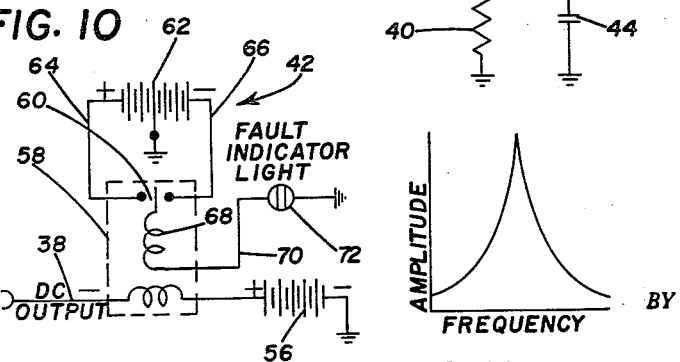
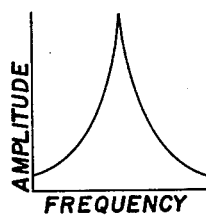
*INVENTOR.*
DIETRICH K. HAUSEN
BY
*ATTORNEY*

United States Patent Office 3,107,330
Patented Oct. 15, 1963

3,107,330
APPARATUS FOR MEASURING AMPLITUDE AND
FREQUENCY OF MODULATED SIGNALS
Dietrich K. Hausen, Dayton, Ohio, assignor of one-half
to Burchell E. Horn, Dayton, Ohio
Filed Jan. 2, 1959, Ser. No. 784,553
2 Claims. (Cl. 324—78)

This invention relates to electromagnetic equipment for testing electromagnetic wave signals. It is desirable in various testing procedures to employ electromagnetic wave signals which must be of an exact predetermined frequency and, to a lesser degree, of an exact predetermined amplitude. If the signal should vary either in frequency or in amplitude, such information should be readily detected.

Presently used devices for checking frequencies are limited, especially at higher frequencies. Such techniques, for example, as the oscilloscope method are useful only for frequencies up to about 50 mc. and since the procedure involves a signal generator, then the accuracy of the testing is dependent upon accuracy of the output signal of the signal generator. This method is therefore limited as to degree of accuracy (about 3%), it is time consuming, and is inherently limited to certain frequencies, below about 50 mc.

Other testing procedures used are: the grid dip meter, generally useful only for measuring frequencies up to about 400 mc. with an accuracy of about 5%; the direct counting of sine-waves on the cathode ray tube of an oscilloscope with an accuracy of about 4%; and the so-called "Lecher line" method which uses two stretched parallel conductors to which is applied the test signal. Measurements of frequency by the last named procedure are the most accurate (better than 1%) and best adapted to high frequencies, but the method is also time consuming and requires a skilled technician.

It is therefore an object of the present invention to provide a method and device for testing electromagnetic wave signals of high frequency range suitable for radar signals and higher frequencies, with a degree of accuracy of about ½%. The signals to be tested may be modulated or not, and in the case of modulated signals, testing is performed both of the carrier and modulation. Moreover, the testing of these signals can be accomplished rapidly and therefore economically, and does not require especially skilled operators.

A further object of the invention is to provide a test device which is embodied in a relatively small volume and is therefore readily transportable. It is also a characteristic of the invention that expensive electrical components such as oscilloscopes are not required.

A further advantage of the invention is that the test results are substantially unaffected by extraneous conditions such as stray magnetic fields, temperature variations, etc. so that the test information is reliable.

An overall object of the invention is to achieve the foregoing features by usage of reactance components which may be either capacitors or inductance elements which will modify the amplitude of the test signal as a function of the frequency thereof, the modified signal then being converted to a continuous D.C. amplitude for sensing. The test then consists of noting deviations of the D.C. amplitude according to the frequency of the input signal.

Other objects and features of the invention will become apparent from a consideration of the following drawings wherein a plurality of selected embodiments are described by way of example.

In the drawings:

FIGURE 1 is a schematic view of the components and circuitry used in one test device, the effect on the input signal by the respective components being shown thereabove;

FIGURE 2 is a detail view of the fault indicator for evidencing deviations of frequency or amplitude of the input signal being tested and, moreover, showing whether the deviation is a positive or negative deviation;

FIGURE 3 is a circuit diagram showing the components used for testing an input signal and indicating a fault when the deviation is for either amplitude or frequency, without distinguishing between the two;

FIGURE 4 is a circuit diagram showing the components used in separately testing frequency and amplitude and detecting a deviation in frequency or amplitude of an input signal with distinguishment between the two characteristics;

FIGURE 5 is a circuit diagram especially useful for testing frequency of weak input signals;

FIGURE 6 is a circuit diagram used in a device for testing modulated signals in which the carrier is checked for both amplitude and frequency but as separate values and the modulation signal checked for both frequency and amplitude without discriminating between the two;

FIGURE 7 is a circuit diagram corresponding to that of FIGURE 5 but with a capacitor substituted for the inductance;

FIGURE 8 is a circuit diagram with an arrangement of components corresponding to that of FIGURE 4 but with capacitors instead of inductance means;

FIGURE 9 effects the same testing as that shown in FIGURE 6 but uses capacitors in the place of inductance members;

FIGURE 10 is another fault indicator which is usable at the D.C. output of the respective circuits and which will evidence a deviation but without an indication of the kind of deviation; and FIGURE 11 is an amplitude-frequency curve typical of the inductances used in the circuits, FIGURES 3–6.

Referring to FIGURE 1, a radio frequency generator labelled 10 generates a sine wave signal 12 which is to be tested for amplitude and frequency. The sine wave 12 should not vary especially in frequency and secondarily in magnitude and it is the function of the test device designated generally by reference numeral 14 to indicate deviations in either frequency or amplitude if they arise.

The sine wave 12 is transmitted by conductor 16 to an inductance coil 18 which is grounded at 20 and connected with conductor 16 at end 22. The inductance 18 is adjustable at 24 by means of a movable core (not shown) so that at the assigned frequency of the signal 12 the inductance will develop its maximum counter E.M.F. thereby maintaining current flow at a minimum, so that the amplitude of the signal 26 within the inductance 18 very nearly approaches the amplitude of the signal 12. It is well to note at this point that the circuit and components therein react in accordance with power consuming circuits and not as power generating circuits. This applies generally throughout all of the embodiments of the invention.

Should the frequency of the signal 12 vary from the assigned frequency, for which the inductance 18 is adjusted, then the amplitude of the signal 26 within the inductance 18 will drop appreciably because resonant condition of the inductance 18 is lost and the self induced counter E.M.F. allows current flow which sharply reduces the value of the amplitude (FIGURE 11). It is characteristic of high frequency signals that as resonant condition is approached the amplitude is sharply peaked, thus, only very slight frequency deviations will produce substantial amplitude change. The function then of the inductance 18 is to relate changes of frequency to a change of amplitude and with such sensitivity that only very slight deviations of frequency are necessary to produce measurable change in amplitude. It is now only necessary to put the signal in a detectable form and there is then available a means for directly relating an amplitude value to frequency.

The signal 26, which is thus subject to change in amplitude by deviations from a predetermined frequency, is developed at the same frequency in inductance 28 which serves as an indirect coupling means by mutual inductance with 18. The signal now appears as 30 and it is of only slightly reduced magnitude when compared with 26 due to inevitable losses. When the frequency of signal 12 corresponds with its assigned frequency, at which the inductance 18 is in resonance, transmission of the signal from conductor 16 to inductance 18 occurs with minimum loss and therefore signal 30 approaches its maximum value (is most nearly like signal 12).

Obviusly, for deviations in frequency of signal 12, from its assigned value, there will be substantial amplitude loss of signal 30 from its maximum value. It should be now apparent that the device 14 functions to sense any change of amplitude of signal 30, this being caused by positive or negative deviations of frequency in signal 12. The signal 30 is modified to make it more readily usable as information, in a manner next to be described.

The rectifier 32 is a germanium-silicon dioxide member. In conductor 34 leading from inductance 18 to the rectifier 32 the signal is a sine wave as shown by 30, but the signal 36 leading from the rectifier 32 in conductor 38 is pulsating and discontinuous owing to the operation of the rectifier 32. A grounded resistance element 40 is next connected to the conductor 38 to minimize variations in the amplitude of the signal in conductor 38 owing to operation of the detector instrument 42 at the terminus of the conductor 38. A grounded capacitor 44 connected in parallel with the conductor 38 converts the pulsating discontinuous 36 to a continuous, slightly pulsating signal 46.

Potentiometer 48 is used to calibrate the magnitude of signal 50 so that the signal 50 becomes calibrated in its value relatively to a given frequency and amplitude of the input signal 12, the principle being that deviations from this standard value will signal a fault in either the frequency or amplitude of the signal 12.

Next, a choker coil 52 is connected in series with the conductor 38 so that all pulsations in the signal 50 are removed, making the signal 54 substantially continuous and thus suitable to be detected by instrument 42. The instrument 42 may consist of any bridge, contact meter, etc. of an indicator, however, as a specific example, the indicator shown in FIGURE 10 has proved satisfactory under actual service conditions.

The calibrated D.C. signal 54 in conductor 38 is balanced against a voltage source 56 (FIGURE 10), which may consist of a dry cell battery. When the signal 54 is in balance with the voltage source 56 then current will not flow through relay 58 so that switch 60 is opened breaking circuit from battery 62 through either conductor 64, 66, coil 68 of relay 58, conductor 70 to fault indicator light 72.

Whenever the signal 54 fails to balance the voltage source 56, whether by increasing or decreasing from its calibrated value then the fault indicator light 72 will signal such fact evidencing a change of frequency in the input signal 12.

It was earlier mentioned that the indicator 42 would evidence a deviation or "fault" in the input signal 12 arising from either change of amplitude or frequency. It should now be clear as to how this is accomplished in the case of deviations in frequency. As to amplitude, the device 14 is not as sensitive in its detection of deviations, but this value is also not as critical to maintain as is frequency. If the amplitude of the signal 12 should increase, but the frequency remain the same, then the operation of the inductance 18 is not affected, and the amplitudes of signals 26, 30, 36, 46, 50 and finally 54 will be proportionately increased to become unbalanced with the counter voltage source 56, causing current flow toward the right (FIGURE 11) energizing the relay 58 and causing lighting of the fault indicator light 72 as previously described.

Conversely, if the amplitude of signal 12 should drop, the frequency of signal remaining the same, then the operation of inductance 18 is unaffected and the respective amplitudes of signals 26, 30, 36, 46, 50 and ultimately 54 become lowered from the calibrated value, again causing an imbalance with respect to voltage source 56 and producing a flow of correct leftwardly (FIGURE 11) to energize relay 58 to produce lighting of fault indicator light 72.

FIGURE 3 is the circuit diagram used in FIGURE 1 separate from the signal generating equipment 10 and fault indicator 42. Under certain circumstances where accuracy is not as important, the D.C. signal in conductor 34 (FIGURE 3) may be directly connected with a detecting means such as a D.C. contact meter and the reading will not be greatly affected because of inertia effects of the moving components. For example, under high temperature conditions when the rectifier 32 cannot be used, this is a desirable arrangement. Under this arrangement, the calibration is made by suitable tuning of coil 28. In this connection, it is preferable that the contact meter be highly responsive and therefore the components are made substantially magnetic free and the movable elements are made as small as possible.

When it is desired to isolate a deviation in the input signal as between amplitude and frequency then the arrangement of components in device 14 may be that shown in FIGURE 4. In this embodiment, the inductance 18 may be the same as in the embodiment of FIGURES 1 and 3. The mutual inductance 28 however, has a tap connection 74 dividing the value of the mutual inductance developed in grounded inductance 28 so that the amplitude of the test signal obtained from inductance 18 in branch 76 is approximately ⅓ greater than is the amplitude in branch 78, the frequencies of the two signals in the respective branches 76, 78 being always identical. The same components, viz., rectifier 32, parallel resistance 40, capacitor 44, potentiometer 48, choker coil 52, and indicator 42 are provided in each of branches 76 and 78 and their operation and calibration are the same as previously described for FIGURES 1, 3, 10. Thus, with deviations of the input signal 12 from an assigned frequency at which the inductance 18 is adjusted for resonance, there will be a substantial amplitude loss of the signal transmitted between coupled inductances 18 and 28 and a fault will be registered by the fault indicator (not shown) combined with each branch 76, 78.

In the case of amplitude change in the input test signal 12, assuming that there is no deviation in frequency of the input signal, the increase or decrease of amplitude is reproduced by a proportionate amount in branches 76 and 78. Bearing in mind that the amplitude in 76 is always ⅓ greater than the amplitude in branch 78, increase or decrease of amplitude in the input signal effects a larger magnitude of change of the continuous D.C. output amplitude 54 in branch 76 and the sensitivities of the detector instruments in each branch 76, 78 are such that the greater amount of amplitude change in branch 76 effects a fault indication without affecting the detector instrument of branch 76. This detection of amplitude fault by one branch 76 without affecting the other branch 78 will apply except for very large deviations of amplitude of the input signal at which the magnitude of amplitude change of the continuous D.C. output in branch 78 will be sufficient to effect operation of the indicator combined therewith.

If the frequency of the input signal 12 from conductor 16 to inductance 18 should deviate from the predetermined assigned frequency at which the inductance 18 is adjusted to resonate, then only very slight frequency deviation is necessary to produce substantial amplitude loss (FIGURE 11) and the loss of amplitude is reflected in transmittal to mutual inductance 28 and correspondingly substantially reduces signals in branches 76, 78 such that the indicators in both branches 76, 78 will be turned on as described in operation of FIGURE 10.

Thus, a deviation of amplitude may be sensed only by the indicator in branch 76, whereas deviation in frequency will be indicated in both branches 76, 78. The two values of amplitude and frequency are therefore isolated and separately evaluated.

For very weak signals, where energy losses in indirect coupling cannot be tolerated as between the two inductances 18 and 28, the arrangement of FIGURE 5 may be used. This arrangement is especially useful for input signals of the order of 100 millivolts. The grounded variable inductance 18 receives the input signal from a conductor 16 and is connected in parallel with a conductor 34 having a rectifier 32, parallel resistance 40, capacitor 44, potentiometer 48 for calibrating the signal, and a choker coil 52.

The variable inductance 18 is adjusted to be in resonance at a frequency which is the desired frequency for the input signal. At this assigned frequency the inductance 18 develops maximum counter E.M.F. and the signal transmitted through conductor 34, and eventually transmitted as a continuous D.C. signal to the indicator is of a maximum magnitude. Assuming deviations in the frequency from its assigned value, the inductance 18 will not be in resonance and the amplitude will decrease sharply (FIGURE 11). Such decrease will be sensed by the indicator as a change from a calibrated continuous D.C. output signal as previously described, and the fault indicator light will go on.

As in the previous embodiment, the sine wave input signal in FIGURE 5 is converted by the various rectifier 32, parallel resistance 40, grounded capacitance 44 potentiometer 48, choke coil 52 components to a continuous D.C. value to make it intelligible to the indicator instrument as equalling or varying from a calibrated value. Still referring to FIGURE 5, assuming no change of frequency but only variation of input signal amplitude, the inductance 18 will not be affected but the continuous D.C. output signal will be proportionately affected, and if the deviation is sufficient, then the fault light in the indicator instrument will go on. The arrangement of FIGURE 5 thus evidences changes of frequency and amplitude but does not distinguish between deviations of one or the other.

Referring next to FIGURE 6, there is shown an arrangement suitable for testing a modulated signal in which the carrier is tested separately for amplitude and frequency, these two values being individually tested, and the modulation is tested for both frequency and amplitude in a single indicator.

The system of FIGURE 6 is the same as that of FIGURE 4 in which branches 76 and 78 are used to test individually the carrier amplitude and frequency and the operation is identical except that the modulation signal is separated from the branch 74 and transmitted through a third branch 80. A high pass filter 82 blocks the modulation signal in conductor 84 of branch 78 and a low pass filter 86 blocks the carrier signal in conductor 88 of branch 80. The two branches 78 and 80 are connected in parallel through a conductor 90 having a tap connection 74 with mutual inductance 28. The tap being located to produce higher amplitude values in branch 76 corresponding with the amplitude value of the carrier just as in the embodiment of FIGURE 4.

As in the previous embodiment (FIGURE 4) the continuous D.C. output in the amplitude carrier test branch 76 is calibrated so that deviations in the input test signal amplitude will produce a greater magnitude of change than in branch 74 and the indicator combined with branch 76 will register a fault before such is sensed in branch 78.

Likewise, deviations in frequency, causing substantial amplitude losses will suffice to operate the trouble lights combined with each branch 74, 76, there being a considerable deviation from the calibrated output continuous D.C. signals in each branch 74, 76 with change of carrier frequency from its assigned value.

The continuous D.C. output signal in branch 80 is separately calibrated relatively to the desired amplitude and frequency of the modulation signal, and deviations in either the frequency or amplitude will be registered by the trouble light (not shown) combined with branch 80 without distinguishing between the two types of deviation. The modulation may obviously be tested for the frequency and amplitude values separately by adding a tap just as in the case of separate testing for the carrier.

Referring next to FIGURE 7, there is shown a system equivalent to that of FIGURE 5 in which a variable capacitor 92 is used in the place of variable inductance 18. The two systems, FIGURE 5, FIGURE 7, function equivalently except that the capacitor 92 instead of an inductance 18 is adjusted to provide a desired amplitude modifying action on the input signal as a function of the frequency thereof.

Thus, means is provided for achieving change in amplitude of the input signal as a function of frequency thereof and the remaining components, rectifier 32, parallel resistance 40, capacitor 44, potentiometer 48, choker 52 convert the signal to a continuous D.C. value calibrated for a selected amplitude and frequency of the input signal. Thus, should deviations in the frequency of the input signal arise, this will effect, by operation of the capacitor 92, a change in amplitude of the A.C. signal in conductor 34 which in turn will be reflected in a deviation of the continuous D.C. output signal from its calibrated value to produce evidence of a fault.

Since change of amplitude in the input signal, unaccompanied by change of frequency, will effect a proportionate change of amplitude in the D.C. output, and a fault will be indicated because of amplitude variation from the calibrated value.

With reference to FIGURE 8, there is shown an arrangement for separately testing amplitude and frequency, equivalent to the embodiment of FIGURE 4 but with capacitor 94 and adjustable capacitor 96 in place of inductance coils 18 and 28.

In this embodiment, the input signal develops a corresponding signal of the same frequency in branches 76 and 78 but of different amplitudes by virtue of operation of the capacitor 94 so that with variations in amplitude of the input signal there will be a greater magnitude of change in branch 76 than in branch 78. As a result, the indicator combined with branch 76 will evidence a deviation in amplitude of the input signal without such deviation affecting the indicator combined with branch 78 because the magnitude of continuous D.C. output amplitude in branch 78 is less affected by amplitude deviations of the input signal. The rectifier 32, resistance 40, capacitor 44, potentiometer 48, choke coil 52 function the same as in the previous embodiments to convert the A.C. signal to a substantially continuous D.C. output signal which is measurable with reference to a calibrated D.C. output signal corresponding with assigned frequency and amplitude values of the input signal.

The capacitance 96 connected in parallel with branch 78 corresponds with 92 of FIGURE 7, so that deviations of frequency of the input signal effect a change in A.C. amplitude in the branch 78 which, when converted by the rectifier 32, capacitor 44, resistance 40, choke coil 52 to a continuous D.C. signal will be of different magnitude than the calibrated D.C. continuous signal and such difference is detected to evidence a frequency fault.

In the event of a frequency fault, the change of amplitude in branch 78 owing to a frequency deviation, will also be registered in branch 76 so that its indicator will also register a fault.

Thus, by the capacitor method, it is also possible to isolate and separately test the two values of amplitude and frequency.

Referring next to FIGURE 9, the capacitor method of FIGURE 8 can be modified for testing modulated signals in the same manner as provided between the systems of FIGURES 4 and 6.

A third branch 80 is connected to branch 78, a high pass filter 82 is added to branch 78, and a low pass filter 86 to branch 80 in order to separate the carrier and modulation signals. The separate testing of carrier amplitude and carrier frequency is the same as the embodiment of FIGURE 8, while the modulation signal in branch 80 is tested identically to the testing in branch 80 of FIGURE 6. The only difference between the embodiments of FIGURES 6 and 9 is that apportionment of amplitude magnitude in branches 76 and 78 is effected by capacitance in the manner of FIGURE 8, and the amplitude is made a function of frequency by means of a capacitor reactance rather than an inductance reactance.

In each of the embodiments it may be desirable to provide information not only as to a deviation but whether the deviation is a positive or negative deviation. Such information may be provided in the indicator designated 100 in FIGURE 2.

The continuous D.C. output in conductor 38 passing through coil 102 of relay 104 is opposed by a voltage source such as battery 106 and when the two are balanced the switch arm 108 is out of engagement with either of contacts 110, 112 so that battery 114 will illuminate "trouble free" light 116 connected therewith through conductors 118, 120, normally closed switch 121 and conductor 122. The battery 114 can also illuminate positive deviation fault light 124 through conductors 118, 130, 131, normally open switch 132, conductor 133; and negative deviation light 135 through conductors 118, 130, 136, normally open switch 137, conductor 138.

Thus, when the D.C. output signal in conductor 38 balances 106, the double acting switch 110—112 is open and trouble free light 116 is "on," but when a deviation occurs, either the positive deviation light 124 or negative deviation light 135 is turned on depending upon the nature of the deviation.

When the D.C. output overbalances 106, the arm 108 makes contact with 112 energizing relay 140 from battery 142 through conductors 141, relay 140, switch 112, relay 104, conductor 144, relay 145 (to open switch 121 and shut off trouble free light 116), conductor 146 and back to battery 142.

When the D.C. output underbalances 106, switch arm 108 contacts 110 to connect battery 150 through conductor 151 to relay 152 (to close switch 137 and turn on negative deviation light 135), conductor 153, contact 110, arm 108, coil 143, conductor 144, relay 145, conductor 146 to battery 150.

Thus, the imbalance or balance of the continuous D.C. output signal against battery 106 serves to indicate a satisfactory condition or the nature of the deviation, if any.

With general reference to all of the circuit arrangements, the capacitor 44, which serves to convert the pulsating signal in conductor 38 to a substantially continuous value, must be of such size as to effect the conversion taking into account the signal amplitude encountered. The specific choice of size of capacitor 44 depends therefore upon the signal characteristics being tested, the calculation of proper value is well within the realm of ordinary skill of the art. Likewise, the reactance members, inductances or capacitances used to relate amplitude of the signal as a function of frequency are selected on the basis of the signal value being tested. The potentiometer 48 also serves, in addition to calibrating a continuous D.C. signal output, the obtainment of a proper order of magnitude of output signal in relation to the detecting instruments 42.

The device 14 receives the signal in a "compatible" form by proper choice of values of the coupling reactances e.g. inductances 18 and 28.

The foregoing may be further illustrated by consideration of the following specific example of component sizes which are suitable for testing signals in the range of from about 5 mc. to about 15 mc.:

The system is that of FIGURE 5.

| | |
|---|---|
| Input signal | 10 mc. |
| Inductance coil 18 | 16 turns #20 enameled wire on ¾" polystyrene rod. |
| Resistance element 40 | 8 KΩ. |
| Capacitor 44 | 0.1 μf. |
| Resistance 48 | 50 KΩ. |
| Choke coil 52 | 10 mc. broadbanded. |

The inductance coil 18 is tuned from 5 mc. to 15 mc. for calibration.

In general, for testing radio frequencies in the higher range, the inductive method is preferred over the capacitor method.

Also, of general information is that the length of coaxial cable, or wave-guide conductor 16 which connects the frequency source to the testing device 14 should be of a specific length in order to leave the converter in balance. It should be further noted that the converter circuit is such as to add no load to the circuit under test.

The placement of components may be critical because of the possibility of any strong field which might cause interference and inaccuracies. In other words, the components are placed so as not to exert any adverse effect one upon the other during operation. To circumvent this, the whole unit is embodied within a shielding of mu metal, or other suitable shielding, which prevents interference of these strong fields with the normal operation of the device. To safeguard against changes due to ambient temperature variations, the components are molded in a matrix of polystyrene or other material selected on the basis of the particular application.

Since the methods and devices herein described are for the purpose of illustration only, it is to be understood that the present invention includes all modifications and equivalents which fall within the scope of the invention which is defined by the appended claims.

What is claimed is:

1. A device for checking the carrier and modulation of an A.C. signal comprising a grounded variable inductance adapted to receive said modulated signal and to effect a modification in amplitude as a function of frequency thereof, means for adjusting said inductance to produce resonance thereof at a predetermined frequency of said carrier, inductance means for indirect coupling with said signal-receiving inductance to develop a maximum amplitude through mutual inductance at resonance condition of said signal receiving inductance, means for unequally distributing the energy in said coupling inductance, two parallel branch circuits arranged to receive said modified signal from said coupling inductance at the frequency of said input signal but at different amplitude values in each said branch, means for converting said signal in the higher amplitude branch of said signal to a substantially continuous D.C. amplitude value, calibrating means for obtaining a D.C. amplitude value in said higher amplitude branch corresponding with a predetermined amplitude value of said carrier signal, means for sensing said continuous D.C. amplitude value and evidencing deviations from said calibrated amplitude value, a high pass filter and a low pass filter in said lower amplitude branch for separating said carrier and modulation signals into separate branches, and means in each said separate branches for converting said respective carrier and modulation signals to a continuous value, calibrating means for respectively calibrating the amplitude values of said filtered signals to correspond with an assigned frequency of said carrier signal and said modulation signal and sensing means for evidencing deviations from said calibrated values to indicate separately change of said carrier and modulation frequency.

2. A device for testing modulated signals comprising two branch circuits connected in parallel relation and adapted to receive modulated input signal for testing, a capacitor connected in series with one of said branches to produce unequal amplitude values of the signals generated in said branches from said input signal, a grounded variable capacitor connected in parallel with each of said branches to modify the amplitude of said test signal in said second branch as a function of frequency of said input signal, a third branch having a tap connection with said second branch and in parallel circuit relation with said grounded capacitor, a high pass filter in series connection with said second branch, a low pass filter in series connection with said third branch whereby the carrier and modulation signals are separated and pass individually through said second and third branches respectively, means in each of said three branches for converting the signal therein to a substantially continuous D.C. amplitude, calibrating means in each of said circuits for establishing a standard amplitude corresponding to an assigned carrier amplitude in said first branch, a carrier frequency in said second branch, and a combination carrier and frequency value in said third branch, and sensing means in each of said three branches responsive to the continuous D.C. output signals therein and adapted to indicate deviations from the respective calibrated values to evidence deviations of the carrier amplitude in said first branch, deviations of carrier frequency in said second branch, and deviations of both frequency and amplitude of the modulation signal in said third branch.

References Cited in the file of this patent
UNITED STATES PATENTS

| | | |
|---|---|---|
| 1,152,632 | Hogan | Sept. 7, 1915 |
| 2,113,221 | Pullis | Apr. 5, 1938 |
| 2,276,669 | Pullis | Mar. 17, 1942 |
| 2,276,672 | Van Roberts | Mar. 17, 1942 |
| 2,290,327 | Hansell | July 21, 1942 |
| 2,343,633 | Baldwin | Mar. 7, 1944 |
| 2,416,310 | Hansen | Feb. 25, 1947 |
| 2,505,164 | Weathers et al. | Apr. 25, 1950 |
| 2,561,357 | Garfield | July 24, 1951 |
| 2,603,754 | Hansen | July 15, 1952 |
| 2,798,152 | Janssen | July 2, 1957 |
| 2,886,709 | Goldberg et al. | May 12, 1959 |
| 2,893,651 | Singleman | July 7, 1959 |
| 2,941,075 | Christian | June 14, 1960 |
| 2,947,863 | Buie | Aug. 2, 1960 |

OTHER REFERENCES

Fitzmorris (Abstract) 580,216, published May 9, 1950.